(12) United States Patent  (10) Patent No.: US 7,661,408 B2
Kassner  (45) Date of Patent: Feb. 16, 2010

(54) METHOD FOR OPERATING INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/982,242

(22) Filed: Oct. 31, 2007

(65) Prior Publication Data

US 2008/0082248 A1 Apr. 3, 2008

Related U.S. Application Data

(63) Continuation of application No. 11/595,733, filed on Nov. 8, 2006, now Pat. No. 7,334,567.

(30) Foreign Application Priority Data

Nov. 17, 2005 (DE) ........................ 10 2005 054 737

(51) Int. Cl.
*F02M 7/00* (2006.01)
*F02M 7/12* (2006.01)

(52) U.S. Cl. ...................................... 123/435

(58) Field of Classification Search ................. 123/399, 123/319, 435, 395, 403, 301, 306; 73/114.31, 73/114.32, 114.33
See application file for complete search history.

(56) References Cited

U.S. PATENT DOCUMENTS

| 5,038,737 | A | * | 8/1991 | Nishiyama et al. ...... 123/406.42 |
| 5,123,391 | A | * | 6/1992 | Ohkubo et al. ............... 123/435 |
| 5,140,850 | A | * | 8/1992 | Ellmann et al. ............. 73/118.2 |
| 5,947,086 | A | | 9/1999 | Hoshino et al. |
| 6,561,016 | B1 | | 5/2003 | Suhre et al. |
| 6,874,471 | B2 | | 4/2005 | Hoshino et al. |
| 2002/0121267 | A1 | | 9/2002 | Denz |
| 2003/0075146 | A1 | * | 4/2003 | Niki et al. .................... 123/396 |
| 2003/0084873 | A1 | | 5/2003 | Ishida et al. |
| 2003/0226542 | A1 | | 12/2003 | Hoshino et al. |
| 2005/0039721 | A1 | | 2/2005 | Truscott et al. |
| 2006/0064230 | A1 | | 3/2006 | Damitz et al. |
| 2006/0102147 | A1 | * | 5/2006 | Norimoto et al. ....... 123/406.47 |

* cited by examiner

*Primary Examiner*—Mahmoud Gimie
(74) *Attorney, Agent, or Firm*—Kenyon & Kenyon LLP

(57) ABSTRACT

An internal combustion engine includes a charge motion flap which influences the combustion in at least one combustion chamber of the internal combustion engine. The function of the charge motion flap is monitored. At least one actual value of a variable characterizing the combustion in the combustion chamber is evaluated and the evaluation result is used for function monitoring of the charge motion flap.

25 Claims, 3 Drawing Sheets

METHOD FOR OPERATING INTERNAL COMBUSTION ENGINE

CROSS-REFERENCE TO RELATED APPLICATIONS

This application is a continuation of prior U.S. application Ser. No. 11/595,733 filed Nov. 8, 2006 now U.S. Pat. No. 7,334,567, and claimed priority to German Application No. DE 102005054737.0 filed Nov. 17, 2005, all of which are incorporated herein by reference.

FIELD OF THE INVENTION

The present invention relates to a method for operating an internal combustion engine. The present invention further relates to a computer program, an electric memory medium, and a control and/or regulating device.

BACKGROUND INFORMATION

In modern internal combustion engines, in particular those having direct fuel injection, it has been attempted to positively influence the mixture preparation in the combustion chambers in order to achieve optimum conversion of the injected fuel into mechanical energy. In this connection, a comparatively high turbulence of the air charge ("charge motion") within the combustion chamber is favorable. An increased charge motion or turbulence has a positive impact on the mixture preparation and reduces the exhaust gas emissions.

In order to adjust the motion of the air charge within the combustion chambers, a specific actuator is present in the air intake system in many internal combustion engines, which influences the flow rate of the drawn-in air or of the drawn-in air-fuel mixture by unblocking a variable cross section. Such an actuator is known as a charge motion flap, tumble valve, or swirl valve.

In some countries, it is required by law to monitor the function of the charge motion flap (tumble flap) using OBD ("onboard diagnosis"). In this connection, it is tested if an actual position of the charge motion flap corresponds to a setpoint position required by an engine controller. To this end, the charge motion flap has formerly been coupled to at least one position sensor, which reports the actual position of the charge motion flap to the engine controller. Switch contacts at the end positions of the charge motion flap or potentiometers for continuous recording are known.

An object of the present invention is to refine a method of the type described above so that the internal combustion engine may be manufactured as economically as possible.

SUMMARY OF THE INVENTION

The use of the method according to the present invention makes it possible to monitor the function of an actuator, which influences the combustion in a combustion chamber of the internal combustion engine, for example, a charge motion flap or even a spark plug, without the necessity of additional sensors. Instead, a variable characterizing the combustion in the combustion chamber is evaluated and the function of the actuator is indirectly monitored from the result of this evaluation.

Such variables characterizing the combustion in the combustion chamber are already recorded in modern internal combustion engines. To this end, pressure sensors are used, for example, which directly detect the pressure in at least one combustion chamber of the internal combustion engine. Structure-borne sound sensors or ion-current sensors may also be used to detect a variable characterizing the combustion in a combustion chamber.

The basis of the known method is a known dependence of the combustion process on the function of the actuator to be monitored. In the case of a charge motion flap, for example, the turbulence ("charge motion") in the combustion chamber is directly a function of the position of the charge motion flap, and the combustion process is in turn a function of this turbulence. The greater this turbulence the faster is the conversion of the fuel during the combustion. Variables that are meaningful in particular for characterizing the combustion are therefore combustion characteristic, heating characteristic, and combustion duration. The heating characteristic is preferred in particular since it is comparatively simple to calculate because wall heat losses are not taken into consideration.

It is advantageous in particular if the combustion duration is determined from an energy conversion, which is calculated using a polytropic equation of state. The combustion duration may be understood, for example, as a crank angle between two percentage values (for example, 10% and 90%) of the energy conversion. The energy conversion is determined in a recording occurring in a time slot pattern of, for example, the cylinder pressure during a combustion cycle by an iterative equation of state and a continuous integration. This is possible with low computational complexity.

In a specific type of monitoring, a setpoint value for the variable characterizing the combustion is determined as a function of a setpoint operating position of the actuator and an actual operating point of the internal combustion engine and is compared to the actual value, and an action is performed as a function of the result of the comparison. The operating point of the internal combustion engine is defined, for example, by its speed, an air charge, a set rate of exhaust gas recirculation, etc.

If, for example, the combustion duration is used as a characterizing variable, an actual combustion duration is compared to a setpoint combustion duration. To this end, for example, the difference between a setpoint combustion duration and an actual combustion duration may be compared to a positive and a negative limiting value. These two values take into consideration the tolerances of the calculation of the actual value and the setpoint value. As an action, for example, information may be stored concerning a prohibited deviation of the present charge motion in the combustion chamber so that this may be remedied-during servicing, and/or this information may be displayed via suitable devices.

It is an advantage if the action is only performed if the deviation of the actual value from the setpoint value exceeds the limiting value during a specific number of working cycles in succession. This increases the reliability of the function monitoring. For determining the setpoint value, advantageously at least one characteristic map or characteristic function is used which, for example, was defined in advance on a test bench and stored for the function monitoring.

However, a determined deviation of the actual value from the setpoint value may also be used for a regulation of the actuator. In this manner, the deviation is minimized and the combustion characteristics are optimized accordingly.

An extension of the present invention provides that a changed control signal is supplied to the actuator during the operation of the internal combustion engine, and a corresponding change of a setpoint value of the variable characterizing the combustion is determined and a change of the actual value of the variable characterizing the combustion is then compared to the change of the setpoint value.

The change of the control signal is advantageously selected in such a way that no change of torque or another change of the internal combustion engine behavior noticeable to the user of the internal combustion engine occurs. If the change of the actual value is at least roughly equal to the change of the setpoint value, this means that the actuator is functional. This procedure has the advantage that function monitoring is decoupled from additional influencing variables, which may if necessary be able to influence the variable characterizing the combustion.

DETAILED DESCRIPTION

Figure 1:
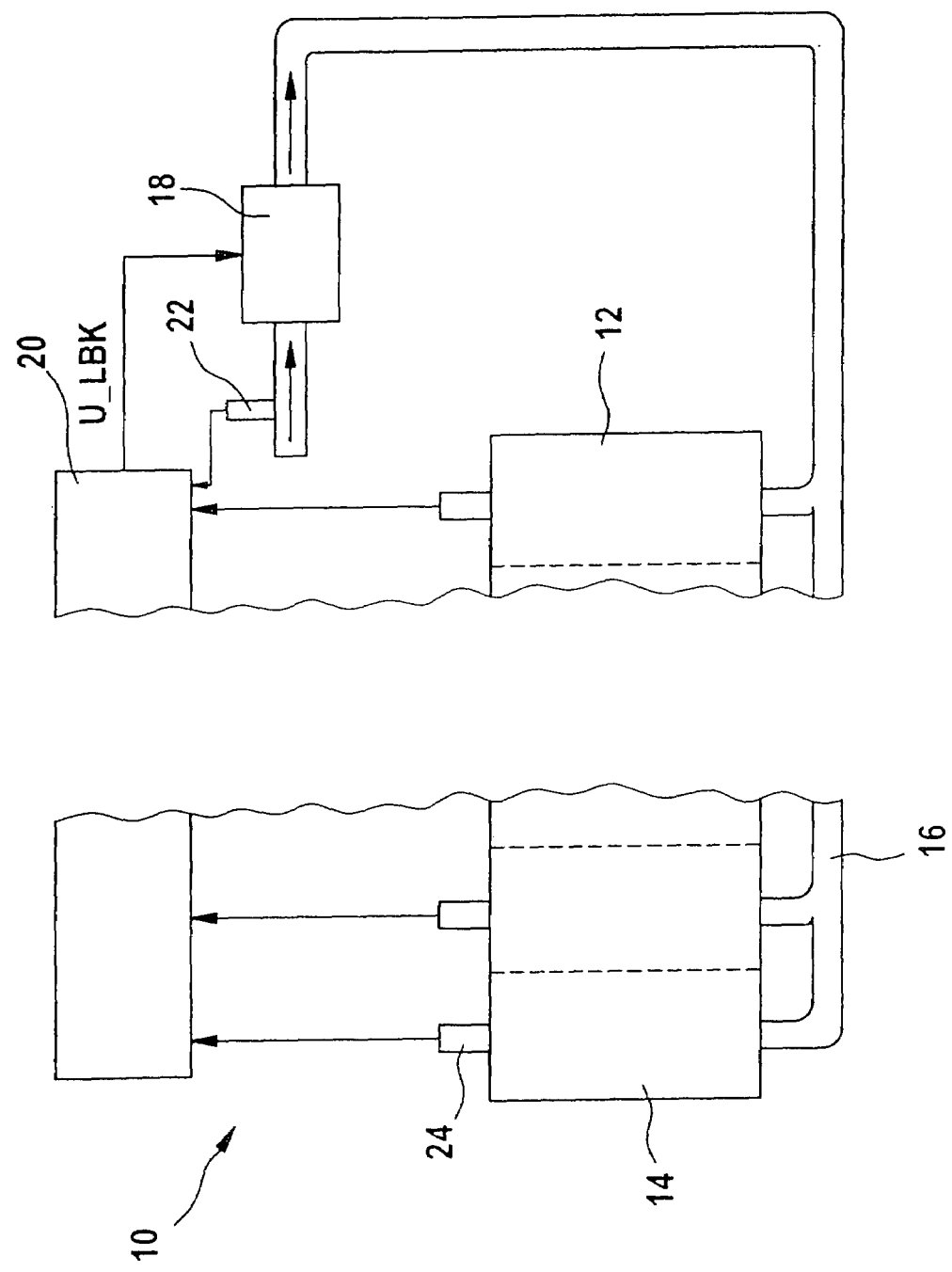
FIG. 1 shows a schematic representation of an internal combustion engine.

In FIG. 1, an internal combustion engine is denoted in its entirety by reference numeral 10. It is used to drive a motor vehicle, which is not shown, and includes an engine block 12 having a plurality of combustion chambers, of which only one in the present case is denoted by reference numeral 14. Combustion air enters combustion chamber 14 through, among other things, a charge motion channel 16 in which a charge motion flap 18 is situated as an actuator.

Charge motion channel 16 and charge motion flap 18 are used to produce the greatest possible turbulence ("charge motion") and thus convert the injected fuel into mechanical energy in as optimal a manner as possible. This favorably influences the fuel consumption and emissions characteristics of internal combustion engine 10.

To this end, it is possible to change the position of charge motion flap 18 based on a corresponding control signal U_LBK. This is provided by a control and regulating device 20. For the control and regulation of internal combustion engine 10, control and regulating device 20 receives numerous input signals, as well as from an HFM Sensor 22, which detects the air mass flowing to combustion chamber 14, from which a corresponding air charge rl is determined in control and regulating device 20.

Control and regulating device 20 also receives signals from pressure sensors, of which only one is provided with a reference numeral 24 in FIG. 1, specifically the one which detects the pressure in combustion chamber 14. The curve of the pressure in combustion chamber 14 and variables derived from it are used as input signals for various control and regulating functions. Additional output signals of control and regulating device 20 are, for example, activation signals for fuel metering and control of the ignition of the air-fuel mixture located in combustion chamber 14.

For the correct operation of internal combustion engine 10, it is important to know if charge motion flap 18 functions properly, i.e., its actual position corresponds with a setpoint position. If this is not the case, allowable limiting values for exhaust gas emissions are exceeded and control and regulating device 20 determines non-optimal control signals (for example, ignition points).

For monitoring of the correct function of charge motion flap 18, a procedure is followed, which is stored as a computer program in a memory of control and regulating device 20. This method will now be explained with reference to FIGS. 2 and 3.

In 26, it is queried whether a combustion cycle starts within a working cycle. If the answer is YES, a pressure $p_i$ is detected in 28. The corresponding signal is provided by pressure sensor 24. Pressure $p_i$ is detected repetitively in discrete time steps i=1 to m by incrementing a time step index i in 29. The corresponding values $p_i$ are stored for the individual time steps i (or crank angle KW of a crankshaft of internal combustion engine 10 which is not shown in FIG. 1) in 30. In 32 it is queried whether the combustion cycle has ended. If the answer is YES, an actual value BD_actual of a variable characterizing the combustion in combustion chamber 14 is determined in 34 from stored pressure values $p_i$.

Figure 3:
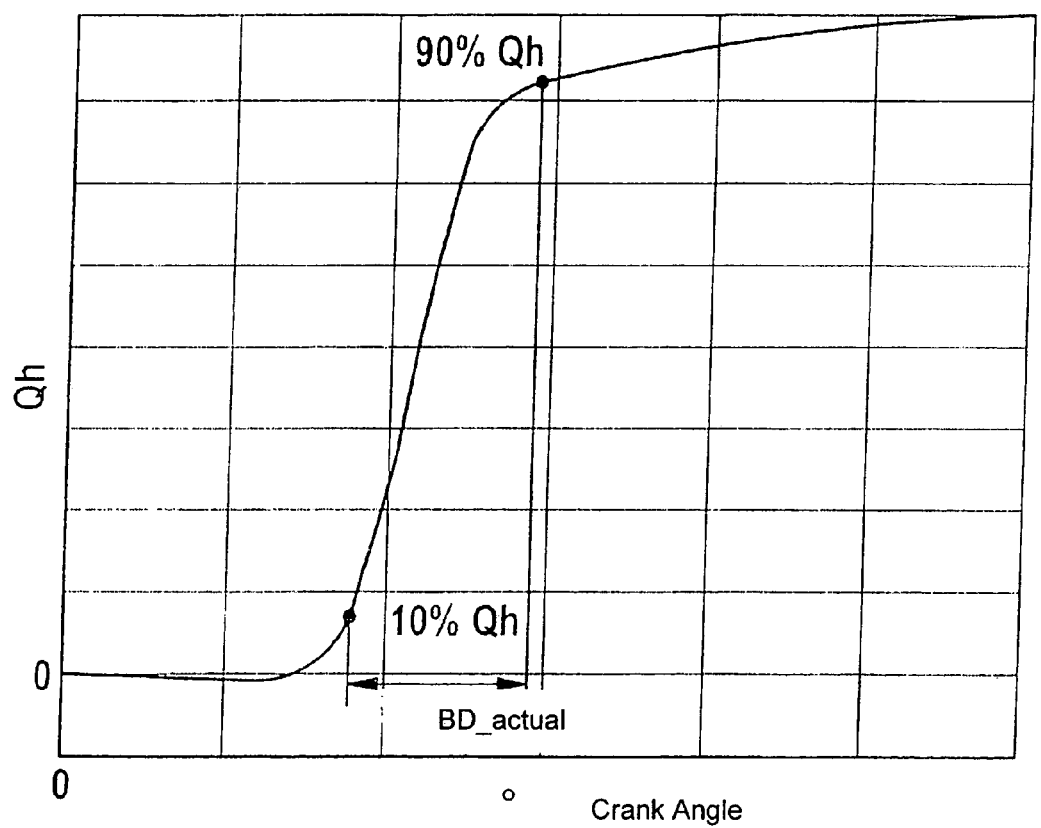
FIG. 3 shows a diagram in which energy transformed during combustion in a combustion chamber of the internal combustion engine of FIG. 1 is plotted against a crank angle.

Physically, this variable represents a combustion duration, which is determined in turn from the heating characteristic. This is a thermodynamic parameter which describes the chronological sequence of the combustion. The use of the heating characteristic in the present method has the advantage that it is comparatively simple to calculate because wall heat losses are not taken into consideration. The following relation applies:

$$dQh = dU + p*dV \quad (1)$$

where dQh is the quantity of heat supplied, dU is the increase of the internal energy of the gas, and p*dV is the delivered mechanical work. Through integration across the crank angle, the percentage share of energy conversion Qh across the crank angle is determined from variable dQh in 34. FIG. 3 shows a typical curve of such an integral across crank angle KW. A value in ° KW between two percentage values of energy conversion Qh is understood to be combustion duration BD_actual. In the present case, as actual combustion duration BD_actual, the crank angle is understood to be between an energy conversion Qh of 10% and an energy conversion Qh of 90%.

A simple possibility for calculating the heating characteristic necessary for determining combustion duration BD_actual from pressure values $p_i$ stored in 30 is to use the following polytropic state equation:

$$\Delta Q_i = \frac{n}{n-1} * p_i * (V_{i+1} - V_{i-1}) + \frac{1}{n-1} * V_i * (p_{i+1} - p_{i-1}) \quad (2)$$

where i is the running index of cylinder pressure $p_i$ used in 28 and also stored in 30 from the start to the end of the calculation interval; n is the polytrope exponent. It should be pointed out here that the calculation interval does not necessarily have to include the entire combustion cycle. In order to save computing capacity, it is also possible to limit the calculation to the relevant portion of the combustion cycle in which the energy is liberated from the fuel. $\Delta Qi$ is the energy conversion at time step i.

Energy conversion Qh over crank angle KW is now determined by summation or integration corresponding to the following formula:

$$Qh_m = \sum_{i=1}^{m} \Delta Q_i \quad (3)$$

After integration across the complete combustion cycle, i.e., the determination of the 100% value, crank angle KW is determined for 10% or 90% of the 100% value of energy conversion Qh. The difference between these two crank angles KW produces combustion duration BD_actual.

In 36, the setpoint value for the variable characterizing the combustion is determined, i.e., a setpoint combustion duration BD_setpoint. This setpoint value BD_setpoint is based on control variable U_LBK used to actuate charge motion flap 18. This control variable U_LBK is thus a setpoint operating position of the variable characterizing charge motion flap 18. Furthermore, a rotational speed nmot of the crankshaft of internal combustion engine 10, an air charge rl (based on the signal of HFM sensor 22) and a set rate AGR of an exhaust gas recirculation are also taken into consideration for the determination of setpoint value BD_setpoint.

Corresponding characteristic maps and characteristic functions are used for this purpose in 38. Additional operating parameters of internal combustion engine 10 may also be used for the most exact determination possible of setpoint value BD_setpoint. For example, the data of these characteristic maps and characteristic functions have been determined in advance on a test bench for the particular internal combustion engine type for various positions of charge motion flap 18 and at the operating points of internal combustion engine 10 to be expected for monitoring.

In 40, the difference between setpoint value BD_setpoint and actual value BD_actual is formed and it is checked if this difference is greater than a limiting value G1. If this is not the case, it is checked in 42 if the same difference is smaller than a second limiting value G2. If the answer in 40 or 42 is YES, an action is performed in 44. This action may be that information concerning a deviation of the present charge motion in combustion chamber 14 from a desired charge motion is stored in control and regulating device 20 so that it can be retrieved in a later servicing of internal combustion engine 10. However, the exceeding of one of the two limiting values G1 and G2 may also be displayed immediately. In order to avoid incorrect indications, it is provided that the display in 44 or the storage of a deviation only occurs if one of limiting values G1 and G2 was exceeded during a plurality of successive working cycles or combustion cycles of internal combustion engine 10. The procedure ends in 46.

Figure 2:
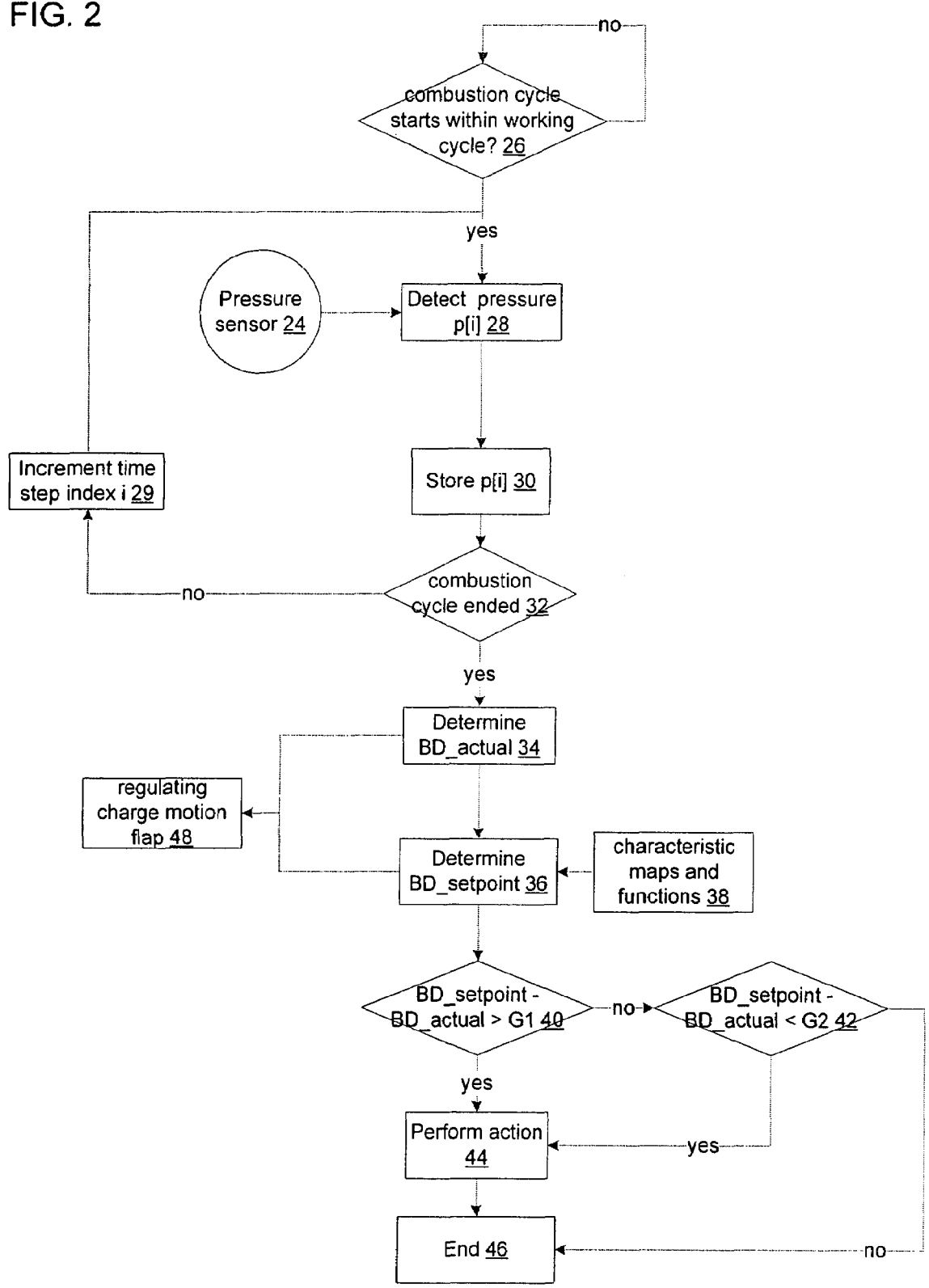
FIG. 2 shows a flow chart of a method for operating the internal combustion engine of FIG. 1.

Physically, the method shown in FIG. 2 is based on the fact that if charge motion flap 18 does not assume a desired position, the charge motion or turbulence in combustion chamber 14 is not as desired. Accordingly, the heating characteristic also deviates from a desired heating characteristic, which is determined by comparing desired combustion duration BD_setpoint with actual combustion duration BD_actual. Such a deviation is therefore an indication and if necessary also a measure of a deviation of the actual position of charge motion flap 18 from a desired position.

However, actual value BD_actual and setpoint value BD_setpoint may also be used in 48 for regulating charge motion flap 18. This means that the deviation between setpoint value BD_setpoint and actual value BD_actual is regulated.

In an exemplary embodiment which is not shown, charge motion flap 18 is actuated in such a way that no change of the torque of internal combustion engine 10 or similar changes in the behavior of internal combustion engine 10 are noticeable to its user. If, however, the expected change of actual value BD_actual occurs, charge motion flap 18 is functional. This version of the method has the advantage that specific influencing variables that also influence the combustion duration and accordingly actual value BD_actual are decoupled from the function test of charge motion flap 18.

What is claimed is:

1. A method for operating an internal combustion engine, the method comprising:
evaluating at least one actual value of a variable characterizing a combustion in at least one combustion chamber of the engine; and
monitoring, as a function of the evaluation, a correct operation of at least one actuator which influences the combustion in the at least one combustion chamber of the engine, wherein the at least one actuator includes a charge motion flap.

2. The method according to claim 1, wherein the engine is of a motor vehicle.

3. The method according to claim 1, wherein the variable characterizes a chronological sequence of the combustion, including at least one of a combustion characteristic, a heating characteristic and a combustion duration.

4. The method according to claim 1, wherein a setpoint value is determined using at least one of (a) at least one characteristic map and (b) at least one characteristic function, wherein the action is performed only if a deviation of the actual value from the setpoint value at least reaches a limiting value during a specific number of working cycles in succession, and wherein the deviation of the actual value from the setpoint value is used for a regulation of the actuator.

5. A method for operating an internal combustion engine, the method comprising:
evaluating at least one actual value of a variable characterizing a combustion in at least one combustion chamber of the engine; and
monitoring, as a function of the evaluation, a function of at least one actuator which influences the combustion in the at least one combustion chamber of the engine, wherein the at least one actuator includes a charge motion flap; and
determining the combustion duration from an energy conversion which is calculated using a polytropic equation of state;
wherein the variable characterizes a chronological sequence of the combustion, including at least one of a combustion characteristic, a heating characteristic and a combustion duration.

6. The method according to claim 5, wherein a setpoint value is determined using at least one of (a) at least one characteristic map and (b) at least one characteristic function, wherein the action is performed only if a deviation of the actual value from the setpoint value at least reaches a limiting value during a specific number of working cycles in succession, and wherein the deviation of the actual value from the setpoint value is used for a regulation of the actuator.

7. The method according to claim 5, wherein the variable characterizes a chronological sequence of the combustion, including at least one of a combustion characteristic, a heating characteristic and a combustion duration.

8. A method for operating an internal combustion engine, the method comprising:
evaluating at least one actual value of a variable characterizing a combustion in at least one combustion chamber of the engine; and
monitoring, as a function of the evaluation, a function of at least one actuator which influences the combustion in the at least one combustion chamber of the engine, wherein the at least one actuator includes a charge motion flap;
determining a setpoint value for the variable characterizing the combustion as a function of a variable characterizing a setpoint position of the actuator, and as a function of an actual operating point of the internal combustion engine;

comparing the setpoint value to the actual value; and performing an action as a function of a result of the comparison.

9. The method according to claim 8, wherein the setpoint value is determined using at least one of (a) at least one characteristic map and (b) at least one characteristic function.

10. The method according to claim 8, wherein the action is performed only if a deviation of the actual value from the setpoint value at least reaches a limiting value during a specific number of working cycles in succession.

11. The method according to claim 10, wherein the deviation of the actual value from the setpoint value is used for a regulation of the actuator.

12. The method according to claim 5, wherein the setpoint value is determined using at least one of (a) at least one characteristic map and (b) at least one characteristic function, wherein the action is performed only if a deviation of the actual value from the setpoint value at least reaches a limiting value during a specific number of working cycles in succession, and wherein the deviation of the actual value from the setpoint value is used for a regulation of the actuator.

13. The method according to claim 5, wherein the combustion duration is determined from an energy conversion which is calculated using a polytropic equation of state, and wherein the variable characterizes a chronological sequence of the combustion, including at least one of a combustion characteristic, a heating characteristic and a combustion duration.

14. A method for operating an internal combustion engine, the method comprising:

evaluating at least one actual value of a variable characterizing a combustion in at least one combustion chamber of the engine; and monitoring, as a function of the evaluation, a function of at least one actuator which influences the combustion in the at least one combustion chamber of the engine, wherein the at least one actuator includes a charge motion flap;

supplying a changed control signal to the actuator during an operation of the internal combustion engine;

determining a corresponding change of a setpoint value of the variable characterizing the combustion; and subsequently comparing a change of the actual value of the variable characterizing the combustion to the change of the setpoint value.

15. The method according to claim 14, wherein the setpoint value is determined using at least one of (a) at least one characteristic map and (b) at least one characteristic function, wherein the action is performed only if a deviation of the actual value from the setpoint value at least reaches a limiting value during a specific number of working cycles in succession, and wherein the deviation of the actual value from the setpoint value is used for a regulation of the actuator.

16. The method according to claim 14, wherein the combustion duration is determined from an energy conversion which is calculated using a polytropic equation of state, and wherein the variable characterizes a chronological sequence of the combustion, including at least one of a combustion characteristic, a heating characteristic and a combustion duration.

17. A computer-readable medium for at least one of a control device and a regulating device of an internal combustion engine, the computer-readable medium containing a computer program which when executed by a processor performs the following method for operating the engine:

evaluating at least one actual value of a variable characterizing a combustion in at least one combustion chamber of the engine; and monitoring, as a function of the evaluation, a correct operation of at least one actuator which influences the combustion in the at least one combustion chamber of the engine, wherein the at least one actuator includes a charge motion flap.

18. The computer-readable medium according to claim 17, wherein the engine is of a motor vehicle.

19. The computer readable medium according to claim 17, wherein a setpoint value is determined using at least one of (a) at least one characteristic map and (b) at least one characteristic function, wherein the action is performed only if a deviation of the actual value from the setpoint value at least reaches a limiting value during a specific number of working cycles in succession, and wherein the deviation of the actual value from the setpoint value is used for a regulation of the actuator.

20. A control/regulating device for operating an internal combustion engine, comprising:

an arrangement for evaluating at least one actual value of a variable characterizing a combustion in at least one combustion chamber of the engine; and an arrangement for monitoring, as a function of the evaluation, a correct operation of at least one actuator which influences the combustion in the at least one combustion chamber of the engine, wherein the at least one actuator includes a charge motion flap.

21. The device according to claim 20, wherein the engine is of a motor vehicle.

22. The device according to claim 20, wherein a setpoint value is determined using at least one of (a) at least one characteristic map and (b) at least one characteristic function, wherein the action is performed only if a deviation of the actual value from the setpoint value at least reaches a limiting value during a specific number of working cycles in succession, and wherein the deviation of the actual value from the setpoint value is used for a regulation of the actuator.

23. A control/regulating device for operating an internal combustion engine, comprising:

an arrangement for evaluating at least one actual value of a variable characterizing a combustion in at least one combustion chamber of the engine; and an arrangement for monitoring, as a function of the evaluation, an operation of at least one actuator which influences the combustion in the at least one combustion chamber of the engine, wherein the at least one actuator includes a charge motion flap;

wherein the combustion duration is determined from an energy conversion which is calculated using a polytropic equation of state, and wherein the variable characterizes a chronological sequence of the combustion, including at least one of a combustion characteristic, a heating characteristic and a combustion duration.

24. A method for operating an internal combustion engine, the method comprising:

evaluating at least one actual value of a variable characterizing a combustion in at least one combustion chamber of the engine; and monitoring, as a function of the evaluation, an operation of at least one actuator which influences the combustion in the at least one combustion chamber of the engine, wherein the at least one actuator includes a charge motion flap;

wherein the combustion duration is determined from an energy conversion which is calculated using a polytropic equation of state, and wherein the variable characterizes a chronological sequence of the combustion, including at least one of a combustion characteristic, a heating characteristic and a combustion duration.

25. A computer-readable medium for at least one of a control device and a regulating device of an internal combustion engine, the computer-readable medium containing a computer program which when executed by a processor performs the following method for operating the engine:

evaluating at least one actual value of a variable characterizing a combustion in at least one combustion chamber of the engine; and monitoring, as a function of the evaluation, a correct operation of at least one actuator which influences the combustion in the at least one combustion chamber of the engine, wherein the at least one actuator includes a charge motion flap;

wherein the combustion duration is determined from an energy conversion which is calculated using a polytropic equation of state, and wherein the variable characterizes a chronological sequence of the combustion, including at least one of a combustion characteristic, a heating characteristic and a combustion duration.

* * * * *